United States Patent [19]
Gregg, Jr.

[11] Patent Number: 5,715,785
[45] Date of Patent: *Feb. 10, 1998

[54] METHOD OF LUBRICATING MACHINERY IN THE PRESENCE OF AN ELECTRICAL CHARGE

[76] Inventor: George L. Gregg, Jr., 25606 14th Pl. S., Kent, Wash. 98032

[*] Notice: The terminal 8 months of this patent has been disclaimed.

[21] Appl. No.: 224,679

[22] Filed: Apr. 7, 1994

[51] Int. Cl.$^6$ ........................................ F01M 9/02
[52] U.S. Cl. ................. 123/196 R; 252/23; 184/6.5
[58] Field of Search ................. 123/196 R, 196 S; 184/6.5; 252/23

[56] References Cited

U.S. PATENT DOCUMENTS

| | | | |
|---|---|---|---|
| 4,729,840 | 3/1988 | Lange et al. | 252/46.7 |
| 4,731,189 | 3/1988 | Gregg, Jr. | 252/23 |
| 5,147,252 | 9/1992 | Mace et al. | 475/226 |
| 5,182,037 | 1/1993 | Pialet et al. | 252/47.5 |
| 5,252,249 | 10/1993 | Kurachi et al. | 252/71 |
| 5,271,858 | 12/1993 | Clough et al. | 252/74 |

*Primary Examiner*—Erick R. Solis
*Attorney, Agent, or Firm*—Harry M. Cross, Jr.

[57] ABSTRACT

The method of operating machinery, the internal working elements of which are contained within a closed lubricating system and operating an internal combustion engine, in the presence of an electrical field, wherein the internal working elements are contacted during operation by the lubricating medium herein described. That lubricating medium comprises a major portion of an insulating oil having a hydrophobic nature such as natural or synthetic engine oil and a minor portion of an additive composition. The additive composition comprises an admixture of a metal soap, of the type often used as a thickening agent for greases; and fine particulate solid material of a hydrophilic nature, of the type often used in extreme pressure greases such as graphite and molybdenum disulfide.

36 Claims, No Drawings

5,715,785

METHOD OF LUBRICATING MACHINERY IN THE PRESENCE OF AN ELECTRICAL CHARGE

BACKGROUND OF THE INVENTION

1. Field of the Invention

This invention relates to the operation of machinery wherein relatively-moving elements must be lubricated. It particularly relates to the operation of machinery in a closed lubricating system such as gear boxes, axles, differentials, transmissions, and to the operation of internal combustion engines, wherein the operation of the machinery or engine causes the generation of an electrical field to which a lubrication medium is subjected.

2. Brief Description of the Prior Art

A unique lubricant was developed by the inventor for coating "bullets," the projectiles fired from firearms. This unique lubricant is described in U.S. Pat. No. 4,731,189. It is characterized as a modified wax lubricant comprising a combination of petroleum and silicone oil metallic soap greases, beeswax, graphite and molybdenum disulfide.

Experimentally, this lubricant was incorporated into a gear box lubricant, and then into an engine lubricating oil, in all of which environments the use of the lubricant resulted in extraordinary increases in machine operating efficiency. Then, experimentally, this unique lubricant was incorporated into an engine fuel and employed as a fuel additive, and again, striking increases in operating efficiency occurred.

At first, it was thought that this unique lubricant, having been developed for specific use as a bullet lubricant was simply an extraordinary combination of ingredients that performed exceptionally well in harsh environments. It was thought that the travel of a spiraling bullet down a firearm barrel was the most severe environment; and consequently, use of the lubricant in less severe environments—such as gear boxes or internal combustion engines, would also yield exceptional results. However, when it came to the successful application of this unique lubricant to an internal combustion engine's fuel supply, the exceptional results achieved were not so glibly explained. It was then that a hitherto unknown phenomenon, a synergistic combination of this unique lubricant and an operating environment subjected to an electrical field, was discovered that led to the present invention.

SUMMARY OF THE INVENTION

In the environment of a piece of machinery having internal operating elements within a closed lubricating system or within an internal combustion engine, the operation of which produces an electrical field, the method of this invention comprises providing a supply of an electro-rheological lubricating medium and exposing that medium to the self-generated electrical current while it performs its lubricating function. The synergistic effects of this system may also be realized where an externally-generated electrical field is applied to the environment such that the lubricating medium is subjected to the electrical current during operation.

This lubricating medium is provided as a blend of a major portion of an insulating oil such as natural or synthetic engine oil and a minor portion of an oil additive composition. The additive composition comprises an admixture of a metal soap, of the type often used as a thickening agent for greases; and fine particulate solid material of the type often used in extreme pressure greases such as graphite and molybdenum disulfide. This lubricating medium is among the class of compositions known as electro-rheological fluids ("ER fluids") in that its apparent viscosity increases under the influence of an electric field, manifesting the so-called "Winslow Effect." This lubricating medium comprises an electrically-stable, low-dielectric fluid, having a viscosity suited for use as an engine oil additive, as an engine fuel additive, or as a gear lubricating additive, etc., serving as a dispersion medium; finely-divided, non-conductive solids serving as dispersion particles; and a dispersing agent.

In summary, the method of this invention comprises a method of operating machinery in a closed lubricating system wherein internal elements of the machinery frictionally interact with one another, having the steps of: a) providing an electro-rheological lubricating medium within the system, the medium comprising a combination of a major portion of an insulating oil with a minor portion of an oil additive composition; the oil additive composition comprising an admixture of petroleum and silicone oil, a metallic soap grease, molybdenum disulfide, and fine particulate graphite; and b) operating the machinery in the presence of an electrical field so as to expose the lubricating medium to the electrical field whereby the apparent viscosity of said lubricating medium increases. The machinery may comprise an internal combustion engine having an engine oil lubricating system with the lubricating medium being provided in the engine oil. The machinery may comprise an internal combustion engine having a engine fuel system with the lubricating medium being provided in the engine fuel.

DETAILED DESCRIPTION OF THE INVENTION

Any machine having a closed lubricating system and in an internal combustion engine within which machine elements contact and move relatively to one another is subject to the influence of an electrical field created as a consequence of friction. Electrical currents are generated by the friction developed within the enclosed compartment during operation of the machinery. For example, an encased gearbox, however driven, will be subjected to an electrical current developed by the meshed gears wheels during operation. Likewise, an internal combustion engine will be subjected to an electrical current developed by the piston assemblies traversing their cylinders and by the other relatively moving elements within the engine during operation. In the case of an automobile internal combustion engine, for example, the engine will be subjected to a 12 volt charge on the order of 0.23 to 0.27 amps as a result of friction.

The method of this invention comprises the steps of operating machinery, the internal working elements of which are contained within a closed lubricating system, and operating an internal combustion engine, in the presence of an electrical field, wherein the internal working elements are contacted during operation by the lubricating medium herein described. That lubricating medium comprises a major portion of an insulating oil having a hydrophobic nature such as natural or synthetic engine oil and a minor portion of an additive composition. The additive composition comprises an admixture of a metal soap, of the type often used as a thickening agent for greases; and fine particulate solid material of a hydrophilic nature, of the type often used in extreme pressure greases such as graphite and molybdenum disulfide. Machinery such as internal combustion engines, gear boxes, axle housings, and the like, wherein engaged metal parts are housed within an enclosed compartment, produce an electrical current which acts upon the lubricant of this invention to enhance the lubrication of the parts within the enclosed compartment. The method of lubricating such machinery may be accomplished by incorporating the additive composition of this invention within the lubricating oil that circulates within the enclosed compartment if that lubricating oil satisfies the requirements of an insulating oil as above described. In the case of an internal combustion engine, the method of lubricating the engine may be accomplished by incorporating the lubricating medium of this invention within the engine lubricating oil system and/or within the fuel that powers the engine.

Operating machinery in closed lubricating systems such as gear boxes, drive train differentials, axles, transmissions, and the like, and internal combustion engines, wherein operating elements engage one another, create electrical fields. The operating environment within the compartment that defines the closed system and that contains these operating elements is, therefore, exposed to electrical currents. Typically, such machinery employs a lubricating fluid that bathes the operating elements to prevent the elements from over-heating and/or seizing. The lubricating medium of the present invention synergistically interacts with the electrical currents present in the operating environment to produce a new method of lubricating the machinery system.

The present invention involves the use of a unique class of lubricating media in machinery wherein an electrical current is developed and to which the lubricant is exposed during operation of the machinery. This unique class of lubricating media is formulated from ingredients that, in combination, are electro-rheological. These lubricating media, to be electro-rheological, must include matter that is hydrophilic and uniformly distributed throughout an insulating oil which is both strongly hydrophobic and a good electrical insulator. The lubricating media described herein, when subjected to an electrical field, not only change their lubricating characteristics but also tend to retain these characteristics when the electrical current is removed. As a consequence, it appears to be possible to enhance the lubricating characteristics of the class of lubricants, as described herein, by using such a lubricating medium in an electrically-charged environment where the electrical current is removed and reapplied. A resultant permanent enhancement of these lubricating characteristics appears to be possible to attain.

In the environment of a piece of machinery having internal operating elements within a closed lubricating system, or of an internal combustion engine, the operation of which produces an electrical field, the method of this invention comprises providing a supply of an electro-rheological lubricating medium and exposing that medium to the self-generated current while it performs its lubricating function. This lubricating medium is provided as an blend of a major portion of an insulating oil having a hydrophobic nature such as natural or synthetic engine oil and a minor portion of an oil additive composition. The additive composition comprises an admixture of a metal soap, of the type often used as a thickening agent for greases; and fine particulate solid material of a hydrophilic nature, of the type often used in extreme pressure greases such as graphite and molybdenum disulfide.

A preferred additive composition for use in the lubricating medium of the present invention is a modified wax lubricant comprising a combination of petroleum and silicone oil, metallic soap greases, a waxy ingredient such as beeswax, graphite, and molybdenum disulfide. In compounding the lubricant, the greases and molybdenum disulfide are mixed and heated at an elevated temperature for a period of time. Then, the temperature is lowered and the waxy ingredient and graphite are added and blended at the lower temperature for a period of time.

The additive composition may be formulated in two stages, the first stage yielding what is herein defined as the intermediate composition, and the second stage yielding what is herein defined as the final composition. The intermediate composition may be formulated from basic ingredients such as molybdenum disulfide powder, mineral oil, silicone oil such as phenyl-methyl-silicone oil, and metallic soap grease such as lithium soap grease. Alternately, it may be formulated from commercially-available blended grease and paste lubricating products. In the latter category, MOLYKOTE BR-2 PLUS (a molybdenum disulfide-containing mineral oil-lithium soap base grease), MOLYKOTE 44 (a silicone oil thickened with lithium soap), and MOLYKOTE G-n (a molybdenum disulfide-containing mineral oil base paste) manufactured by Dow Corning of Midland, Mich., U.S.A. are suitable. To these, finely divided molybdenum disulfide powder, such as MOLYKOTE Z powder from Dow Corning, may be included. The preferred combination of the above ingredients is (by weight percent): 9–16% molybdenum disulfide; 13–20% mineral oil; 17–25% silicone oil; and 39–52% metallic soap grease.

This intermediate composition is then preferably blended with 5–28% beeswax and 7–42% microfine graphite to provide the final composition.

The total amount of molybdenum disulfide present in the intermediate composition should be greater than about 5% and less than about 24%. The total amount of mineral oil present in the intermediate composition should be greater than about 10% and less than about 32%. The total amount of silicone oil present in the intermediate composition should be greater than about 13% and less than about 31%. The total amount of metallic soap grease present in the intermediate composition should be greater than about 34% and less than about 61%. Table I lists examples of intermediate composition variations, in weight per cent, that are satisfactory. Example E is particularly outstanding. These examples were formulated using the MOLYKOTE brand products previously identified.

TABLE I

| Ingredient | A | B | C | D | E | F | G | H | I |
|---|---|---|---|---|---|---|---|---|---|
| Molybdenum disulfide | 5 | 24 | 13 | 10 | 12 | 14 | 11 | 16 | 9 |
| Mineral Oil | 18 | 14 | 10 | 32 | 16 | 18 | 12 | 20 | 14 |
| Phenyl Methyl Silicone | 25 | 20 | 25 | 14 | 23 | 13 | 31 | 30 | 17 |
| Lithium Soap Grease | 52 | 42 | 52 | 39 | 49 | 55 | 44 | 34 | 61 |

Table II lists examples of final composition variations, in weight per cent, that are satisfactory. These examples include, as representative, Example E from Table I as the "Intermediate Composition". Table III converts the Table II data to volume per cent to illustrate the substantial portion of beeswax in the final composition.

TABLE II

| Ingredient | J | K | L | M | N | O | P |
|---|---|---|---|---|---|---|---|
| Intermediate Composition | 3 | 16 | 56 | 13 | 7 | 18 | 12 |
| Beeswax | 75 | 65 | 34 | 50 | 85 | 74 | 50 |
| Graphite | 22 | 19 | 10 | 27 | 8 | 8 | 38 |

TABLE III

| Ingredient | J | K | L | M | N | O | P |
|---|---|---|---|---|---|---|---|
| Intermediate Composition | 3 | 7 | 40 | 21 | 13 | 15 | 16 |
| Beeswax | 89 | 78 | 55 | 69 | 79 | 77 | 81 |
| Graphite | 8 | 15 | 5 | 10 | 7 | 8 | 3 |

The ingredients making up the intermediate composition (such as those identified in Table I) are heated to 350–400 degrees F. for several minutes while being stirred continuously. A preferred heating period is about 5 minutes. The temperature is then reduced to 150–350 degrees F. and beeswax and microfine graphite are added. This final composition is blended for a short period, preferably about 2 minutes and then allowed to cool. The intermediate composition must be cooled as specified above before addition of the beeswax to yield a satisfactory final composition having the desired characteristics described.

As an lubricating oil additive, the additive composition may be blended into an engine lubricating oil, a gear oil, or into a transmission oil provided that the oil is of the type defined hereinabove as an insulating oil that is both strongly hydrophobic and a good electrical insulator. The additive composition is effective at concentrations of about 0.05% by volume up to about 12.5% by volume for use as an engine lubricating oil, for use as a gear oil such as for use in a drive train differential, or for use as a transmission oil. A preferred concentration of the additive composition in appropriate lubricating oils is between about two oz. per quart of oil to two oz. per six quarts of oil (about 6.25% by volume to about 1.04% by volume). At this concentration in engine oil, engine operating temperature and exhaust manifold temperature are measurably lowered, and engine RPM's increased for a given throttle load. For example, at a concentration of two oz. per quart (about 6.25% by volume), a 10 degree F. drop in automotive and in aircraft-type engine operating temperatures has been observed, over the operating temperatures of those engines using the same oils without the additive composition of this invention. The additive composition has been combined with various oils (such as SAE Wts. 10-40, 50, and 15-50). Use as an engine oil additive, under conditions wherein a gasoline internal combustion engine operates in the presence of an electrical field of about 12 volts at 0.23 to 0.27 amps., appears to result in increased dynamic sealing between piston rings and cylinder walls and better valve seating, providing higher compression when compared with operation of the same engine with the same engine oil, but in the absence of the additive composition blend.

The additive composition has also been combined with various oils (such as SAE Wts. 10-40, 50, and 15-50) in the range of 14 oz. oil to 2 oz. additive composition (about 14.3% by volume) to produce an exemplary bearing grease.

The addition of the additive composition to greases and oils is accomplished at an elevated temperature, preferably 150–200 degrees F. The lubricant and the grease or oil to which it is to be added are separately pre-heated, and then the two constituents are blended and then allowed to cool to room temperature. The blend remains admixed thereafter.

As a fuel additive, the additive composition of this invention is effective at concentrations of 0.05% by volume up to 6.25% by volume with respect to the volume of fuel, diesel or gasoline, with a range of about 1% by volume to about 3.2% by volume of fuel being preferred. Before being added to the fuel, the additive composition of this invention is blended with a non-detergent motor oil of the type defined hereinabove as an insulating oil that is both strongly hydrophobic and a good electrical insulator. The additive composition is preferably blended at concentrations of 5% by volume up to 25% by volume with respect to the volume of motor oil. The resultant blended lubricating medium may be preferably added to the fuel at concentrations of 1.0% by volume up to 10% by volume with respect to the volume of fuel. A mineral based or synthetic motor oil with an SAE rating of not less than 10 nor more than 50 would be appropriate for blending with the lubricant composition of this invention. Use as a fuel additive, under conditions wherein a gasoline internal combustion engine operates in the presence of an electrical field of about 12 volts at 0.23 to 0.27 amps., has yielded a rise in compression, a rise in efficiency as measured by fuel consumption, and reduced hydrocarbon emissions when compared with operation of the same engine with the same fuel, but in the absence of the lubricating composition blend. Evidence of engine "decoking" has also been observed as a result of the use of this fuel additive.

It appears that the use of this fuel additive lubricates the relatively moving parts, such as pistons, rings and valve with respect to their cylinders and valve seats, respectively, under the influence of an electrical field makes the lubricating fluid stronger. Consequently, the lubricating fluid appears to stick to the metal surfaces better and does a better job of reducing friction. This is most notable after an engine has run over the equivalent of a few hundred miles. It has been observed that an engine runs better and better as a result of this fuel additive until the engine has run the equivalent of a few hundred miles, at which time the engine operation stabilizes and remains at that higher level. There is a rise in engine compression, a rise in engine efficiency resulting in better fuel mileage, and a substantial reduction in emissions, especially hydrocarbons. There is a rise in the temperature of the exhaust gases and a reduction in engine temperature as measured by its cooling water temperature.

As an internal combustion engine fuel additive, the lubricating medium of this invention may be added to gasoline or to diesel fuels.

While the preferred embodiment of the invention has been described herein, variations may be made. The scope of the invention, therefore, is only to be limited by the claims appended hereto.

I claim:

1. A method of operating machinery in a closed lubricating system wherein internal elements of the machinery frictionally interact with one another, the steps of:

a) providing an electro-rheological lubricating medium within said system, said medium comprising a combination of a major portion of an insulating oil with a minor portion of an oil additive composition; said oil additive composition comprising an admixture of petroleum and silicone oil, a metallic soap grease, molybdenum disulfide, fine particulate graphite, and a waxy ingredient; and b) operating the machinery in the presence of an electrical field so as to expose said lubricating medium to said electrical field whereby the apparent viscosity of said lubricating medium increases.

2. The method of claim 1 wherein said machinery comprises an internal combustion engine having an engine oil lubricating system, and said lubricating medium is provided in the engine oil; and wherein said waxy ingredient comprises beeswax.

3. The method of claim 1 wherein said machinery comprises an internal combustion engine having an engine fuel system, and said lubricating medium is provided in the engine fuel; and wherein said waxy ingredient comprises beeswax.

4. A method of operating machinery in a closed lubricating system wherein internal elements of the machinery frictionally interact with one another, the steps of:
   a) providing an electro-rheological lubricating medium within said system, said medium comprising a combination of a major portion of an insulating oil with a minor portion of an oil additive composition; said oil additive composition comprising an admixture of petroleum and silicone oil, a metallic soap grease, molybdenum disulfide, and fine particulate graphite, said oil additive composition being composed of a first portion and a second portion, said first portion having between about 5 wt. % and 24 wt. % molybdenum disulfide, between about 10 wt. % and 32 wt. % mineral oil, between about 13 wt. % and 31 wt. % silicone oil, and between about 34 wt. % and 61 wt. % lithium soap grease and said second portion including said fine particulate graphite in an amount of between about 3% and 15% of the total volume of said oil additive composition; and
   b) operating the machinery in the presence of an electrical field so as to expose said lubricating medium to said electrical field whereby the apparent viscosity of said lubricating medium increases.

5. The method of claim 4 wherein said machinery comprises an internal combustion engine having an engine oil lubricating system, and said lubricating medium is provided in the engine oil.

6. The method of claim 4 wherein said machinery comprises an internal combustion engine having an engine fuel system, and said lubricating medium is provided in the engine fuel.

7. The method of claim 4 wherein said second portion includes a waxy ingredient, the waxy ingredient being present in an amount of between about 55% and 89% of the total volume of said oil additive composition.

8. The method of claim 7 wherein said machinery comprises an internal combustion engine having an engine oil lubricating system, and said lubricating medium is provided in the engine oil.

9. The method of claim 7 wherein said machinery comprises an internal combustion engine having an engine fuel system, and said lubricating medium is provided in the engine fuel.

10. The method of claim 4 wherein said additive composition is blended into an insulating oil selected from the group comprising an engine lubricating oil, a gear oil, or a transmission oil in a concentration of between about 0.05% and 12.5% by volume of said insulating oil.

11. The method of claim 5 wherein said additive composition is blended into the engine oil in a concentration of between about 0.05% and 12.5% by volume of said engine oil.

12. The method of claim 6 wherein said additive composition is blended into the fuel in a concentration of between about 0.05% and 6.25% by volume of said fuel.

13. The method of claim 4 wherein said second portion includes beeswax, the beeswax being present in an amount of between about 55% and 89% of the total volume of said oil additive composition.

14. The method of claim 13 wherein said machinery comprises an internal combustion engine having an engine oil lubricating system, and said lubricating medium is provided in the engine oil.

15. The method of claim 13 wherein said machinery comprises an internal combustion engine having an engine fuel system, and said lubricating medium is provided in the engine fuel.

16. A method of operating machinery in a closed lubricating system wherein internal elements of the machinery frictionally interact with one another, the steps of:
   a) providing an electro-theological lubricating medium within said system, said medium comprising a combination of a major portion of an insulating oil with a minor portion of an oil additive composition; said oil additive composition comprising an admixture of petroleum and silicone oil, a metallic soap grease, molybdenum disulfide, and fine particulate graphite, said oil additive composition being composed of a first portion and a second portion, said first portion having between about 5 wt. % and 24 wt. molybdenum disulfide, between about 10 wt. % and 32 wt. % mineral oil, between about 13 wt. % and 31 wt. % silicone oil, and between about 34 wt. % and 61 wt. % metallic soap grease and said second portion including said fine particulate graphite in an amount of between about 3% and 15% of the total volume of said oil additive composition; and
   b) operating the machinery in the presence of an electrical field so as to expose said lubricating medium to said electrical field whereby the apparent viscosity of said lubricating medium increases.

17. The method of claim 16 wherein said additive composition is blended into an insulating oil selected from the group comprising an engine lubricating oil, a gear oil, or a transmission oil in a concentration of between about 0.05% and 12.5% by volume of said insulating oil.

18. The method of claim 16 wherein said machinery comprises an internal combustion engine having an engine oil lubricating system, and said lubricating medium is provided in the engine oil.

19. The method of claim 18 wherein said additive composition is blended into the engine oil in a concentration of between about 0.05% and 12.5% by volume of said engine oil.

20. The method of claim 16 wherein said machinery comprises an internal combustion engine having an engine fuel system, and said lubricating medium is provided in the engine fuel.

21. The method of claim 20 wherein said additive composition is blended into the fuel in a concentration of between about 0.05% and 6.25% by volume of said fuel.

22. The method of claim 16 wherein said second portion includes beeswax, the beeswax being present in an amount of between about 55% and 89% of the total volume of said oil additive composition.

23. The method of claim 22 wherein said machinery comprises an internal combustion engine having an engine oil lubricating system, and said lubricating medium is provided in the engine oil.

24. The method of claim 22 wherein said machinery comprises an internal combustion engine having an engine fuel system, and said lubricating medium is provided in the engine fuel.

25. An electro-rheological lubricating medium comprising a combination of a major portion of an insulating oil with a minor portion of an oil additive composition; said oil additive composition comprising an admixture of petroleum and silicone oil, a metallic soap grease, molybdenum disulfide, and fine particulate graphite; said oil additive composition comprising a first portion having between about 5 wt. % and 24 wt. % molybdenum disulfide, between about 10 wt. % and 32 wt. % mineral oil, between about 13 wt. % and 31 wt. % silicone oil, and between about 34 wt. % and 61 wt. % metallic soap grease; and said oil additive composition comprising a second portion including said fine particulate graphite in an amount of between about 3% and 15% of the total volume of said oil additive composition.

26. The lubricating medium of claim 25 wherein the second portion of said oil additive composition includes beeswax, the beeswax being present in an amount of between about 55% and 89% of the total volume of said oil additive composition.

27. The lubricating medium of claim 26 wherein said metallic soap grease is lithium soap grease.

28. The lubricating medium of claim 27 wherein said oil additive composition comprises between about 5% and 25% by volume of said lubricating medium.

29. An internal combustion engine fuel additive comprising an electro-rheological lubricating medium comprising a combination of a major portion of an insulating oil with a minor portion of an oil additive composition; said oil additive composition comprising an admixture of petroleum and silicone oil, a metallic soap grease, molybdenum disulfide, and fine particulate graphite; said oil additive composition comprising a first portion having between about 5 wt. % and 24 wt. % molybdenum disulfide, between about 10 wt. % and 32 wt. % mineral oil, between about 13 wt. % and 31 wt. % silicone oil, and between about 34 wt. % and 61 wt. % metallic soap grease; and said oil additive composition comprising a second portion including said fine particulate graphite in an amount of between about 3% and 15% of the total volume of said oil additive composition.

30. The fuel additive of claim 29 wherein the second portion of said oil additive composition includes beeswax, the beeswax being present in an amount of between about 55% and 89% of the total volume of said oil additive composition.

31. The lubricating medium of claim 30 wherein said metallic soap grease is lithium soap grease.

32. The fuel additive of claim 31 wherein said oil additive composition comprises between about 5% and 25% by volume of said lubricating medium.

33. An internal combustion engine lubricating oil additive comprising an electro-rheological lubricating medium comprising a combination of a major portion of an insulating oil with a minor portion of an oil additive composition; said oil additive composition comprising an admixture of petroleum and silicone oil, a metallic soap grease, molybdenum disulfide, and fine particulate graphite; said oil additive composition comprising a first portion having between about 5 wt. % and 24 wt. molybdenum disulfide, between about 10 wt. % and 32 wt. % mineral oil, between about 13 wt. % and 31 wt. % silicone oil, and between about 34 wt. % and 61 wt. % metallic soap grease; and said oil additive composition comprising a second portion including said fine particulate graphite in an amount of between about 3% and 15% of the total volume of said oil additive composition.

34. The lubricating oil additive of claim 33 wherein the second portion of said oil additive composition includes beeswax, the beeswax being present in an amount of between about 55% and 89% of the total volume of said oil additive composition.

35. The lubricating medium of claim 34 wherein said metallic soap grease is lithium soap grease.

36. The lubricating oil additive of claim 35 wherein said oil additive composition comprises between about 5% and 25% by volume of said lubricating medium.

* * * * *